(12) United States Patent
Klein

(10) Patent No.: US 9,012,057 B2
(45) Date of Patent: Apr. 21, 2015

(54) BATTERY CELL ASSEMBLY AND METHOD FOR MANUFACTURING THE BATTERY CELL ASSEMBLY

(71) Applicant: LG Chem, Ltd., Seoul (KR)

(72) Inventor: Martin J. Klein, Grosse Pointe Park, MI (US)

(73) Assignee: LG Chem, Ltd., Seoul (KR)

( * ) Notice: Subject to any disclaimer, the term of this patent is extended or adjusted under 35 U.S.C. 154(b) by 40 days.

(21) Appl. No.: 13/803,072

(22) Filed: Mar. 14, 2013

(65) Prior Publication Data

US 2014/0272519 A1   Sep. 18, 2014

(51) Int. Cl.
*H01M 2/20* (2006.01)
*H01M 2/02* (2006.01)
*H01M 10/42* (2006.01)

(52) U.S. Cl.
CPC ............ *H01M 2/206* (2013.01); *Y10T 29/4911* (2015.01); *H01M 2/021* (2013.01); *H01M 2/0212* (2013.01); *H01M 10/425* (2013.01)

(58) Field of Classification Search
USPC ................. 29/623.1; 429/7, 90, 185, 123
See application file for complete search history.

(56) References Cited

U.S. PATENT DOCUMENTS

| | | | |
|---|---|---|---|
| 2002/0018932 A1* | 2/2002 | Chikada | 429/185 |
| 2011/0236735 A1* | 9/2011 | Fuse | 429/90 |
| 2013/0059171 A1* | 3/2013 | Kim et al. | 429/7 |

* cited by examiner

*Primary Examiner* — Cynthia H Kelly
*Assistant Examiner* — Monique Wills
(74) *Attorney, Agent, or Firm* — Buckert Patent & Trademark Law Firm, PC; John F. Buckert

(57) ABSTRACT

A battery cell assembly is provided. The battery cell assembly includes a battery cell housing having first and second side members coupled together defining an interior region, and a battery cell disposed within the interior region. The battery cell assembly further includes a cable carrier assembly having a carrier member with a first aperture extending therethrough. The carrier member is disposed between first and second end portions of the first and second side members, respectively, and extends outwardly from the battery cell housing. A first cable extends from the interior region of the battery cell housing and through the first aperture of the carrier member to an electronic module disposed on the carrier member.

9 Claims, 8 Drawing Sheets

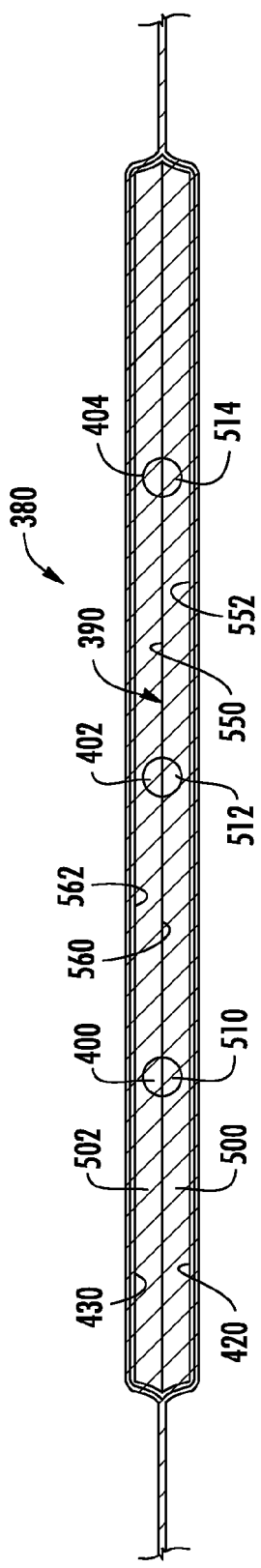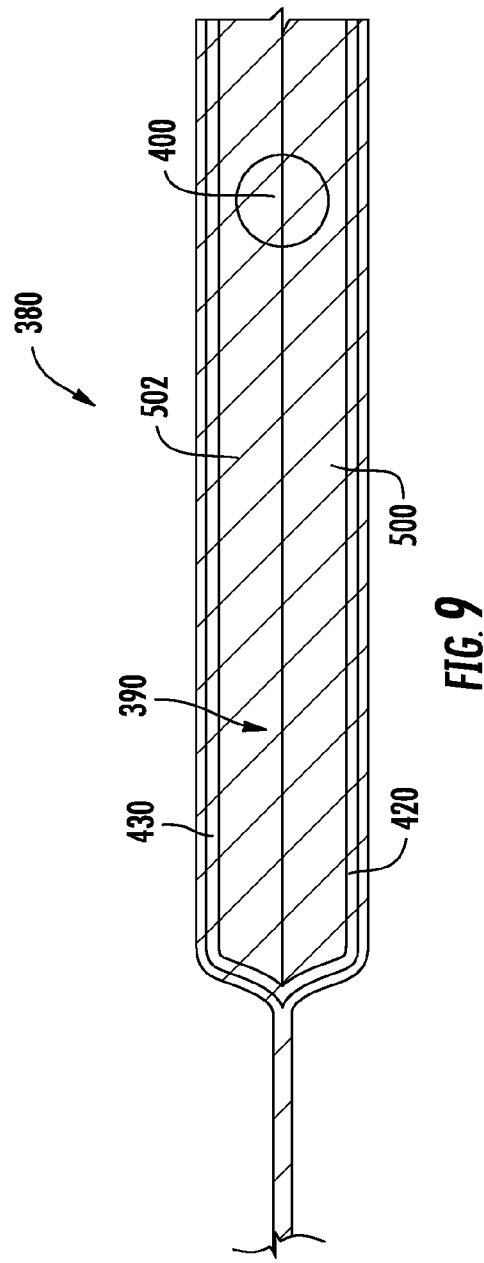

BATTERY CELL ASSEMBLY AND METHOD FOR MANUFACTURING THE BATTERY CELL ASSEMBLY

BACKGROUND

Battery cell assemblies have been developed. However, the battery cell assemblies are not configured to allow a cable to be routed to an interior region of the battery cell assemblies.

Accordingly, the inventor herein has recognized a need for an improved battery cell assembly and a method for manufacturing the battery cell assembly that minimizes and/or eliminates the above-mentioned deficiency.

SUMMARY

A battery cell assembly in accordance with an exemplary embodiment is provided. The battery cell assembly includes a battery cell housing having first and second side members coupled together defining an interior region. The battery cell assembly further includes at least one battery cell disposed within the interior region of the battery cell housing. The battery cell assembly further includes first and second electrical terminals operably coupled to the at least one battery cell and extending outwardly from the battery cell housing. The battery cell assembly further includes a cable carrier assembly coupled to the battery cell housing. The cable carrier assembly includes a carrier member having a first aperture extending therethrough. The carrier member is disposed between first and second end portions of the first and second side members, respectively, and extends outwardly from the battery cell housing. The cable carrier assembly further includes a first cable fixedly held by the carrier member. The first cable extends from the interior region of the battery cell housing and through the first aperture of the carrier member to an electronic module. The electronic module is disposed on the carrier member outside of the battery cell housing and is electrically coupled to an electrical contact member.

A method for manufacturing a battery cell assembly in accordance with another exemplary embodiment is provided. The method includes disposing at least one battery cell within an interior region of the battery cell housing. The battery cell housing has first and second side members at least partially coupled together defining the interior region. The method further includes providing a cable carrier assembly having a carrier member, a first cable, and an electronic module disposed on the carrier member. The first cable extends through a first aperture in the carrier member to the electronic module. The method further includes positioning the carrier member between first and second end portions of the first and second side members, respectively, such that the first cable extends from the interior region of the battery cell housing and through the first aperture of the carrier member to the electronic module and the electronic module is disposed outside of the battery cell housing. The method further includes coupling regions of the first and second end portions of the first and second side members, respectively, to one another such that the carrier member is fixedly held between the first and second end portions and an airtight and moisture-proof seal is formed between the carrier member and the first and second side members.

BRIEF DESCRIPTION OF THE DRAWINGS

FIG. 8 is a cross-sectional view of a cable carrier assembly in accordance with another exemplary embodiment;

FIG. 9 is an enlarged view of a portion of the cable carrier assembly of FIG. 8;

DETAILED DESCRIPTION

Figure 1:
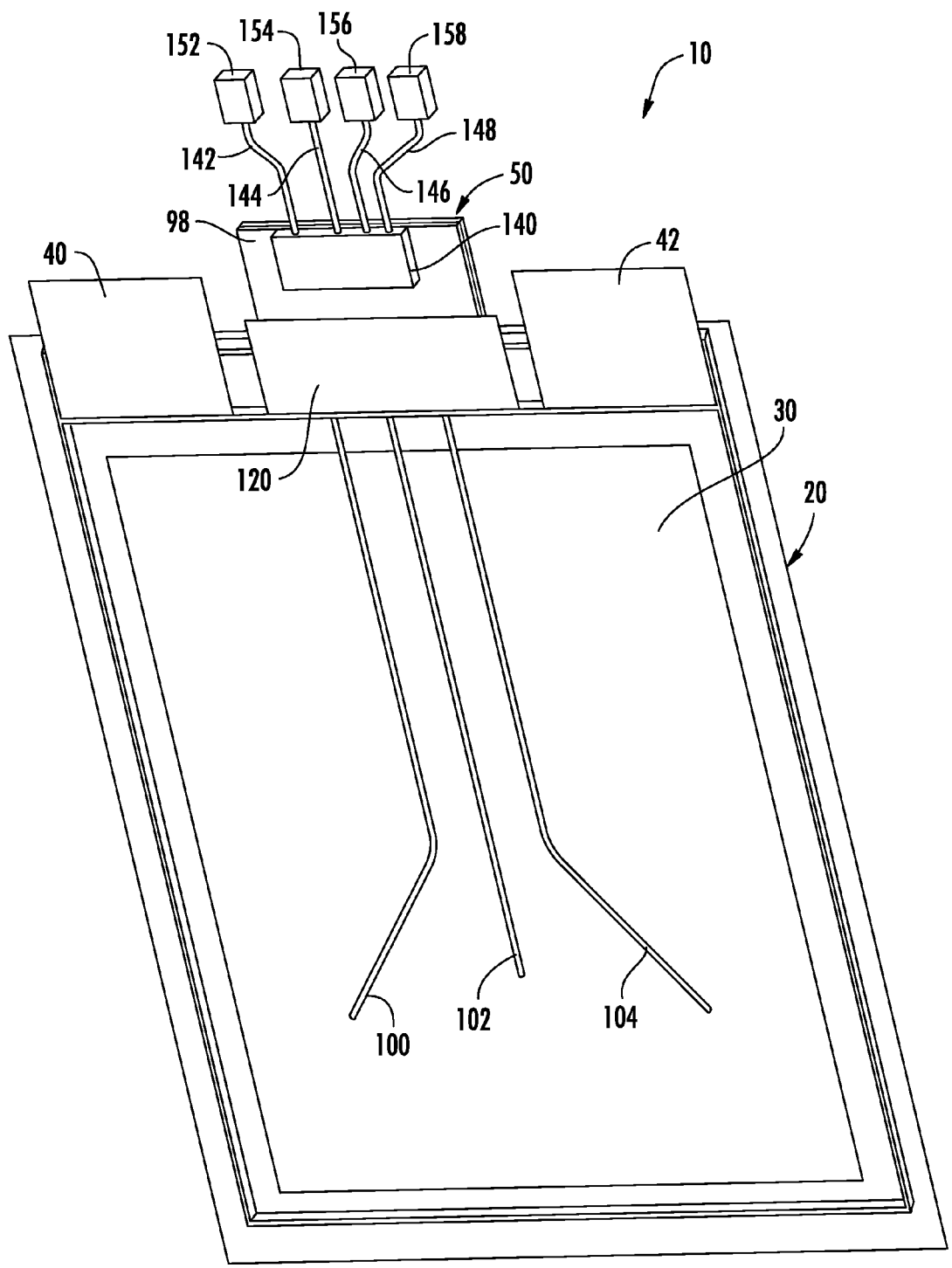
FIG. 1 is a schematic of a battery cell assembly with a portion of a battery cell housing removed to illustrate internal components of the battery cell assembly, in accordance with an exemplary embodiment.

Referring to FIGS. 1-5 and 11, a battery cell assembly 10 in accordance with an exemplary embodiment is provided. The battery cell assembly 10 includes a battery cell housing 20, a battery cell 30, first and second electrical terminals 40, 42, and a cable carrier assembly 50. An advantage of the battery cell assembly 10 is that the assembly 10 utilizes the cable carrier assembly 50 coupled to the battery cell housing 20 that protects and supports cables that extend from the assembly 50 to an interior region of the battery cell housing 20, and forms an airtight and moisture-proof seal with the housing 20. In particular, the cable carrier assembly 50 protects the cables from being crushed or melted when side members of the battery cell housing 20 are coupled together.

Figure 2:
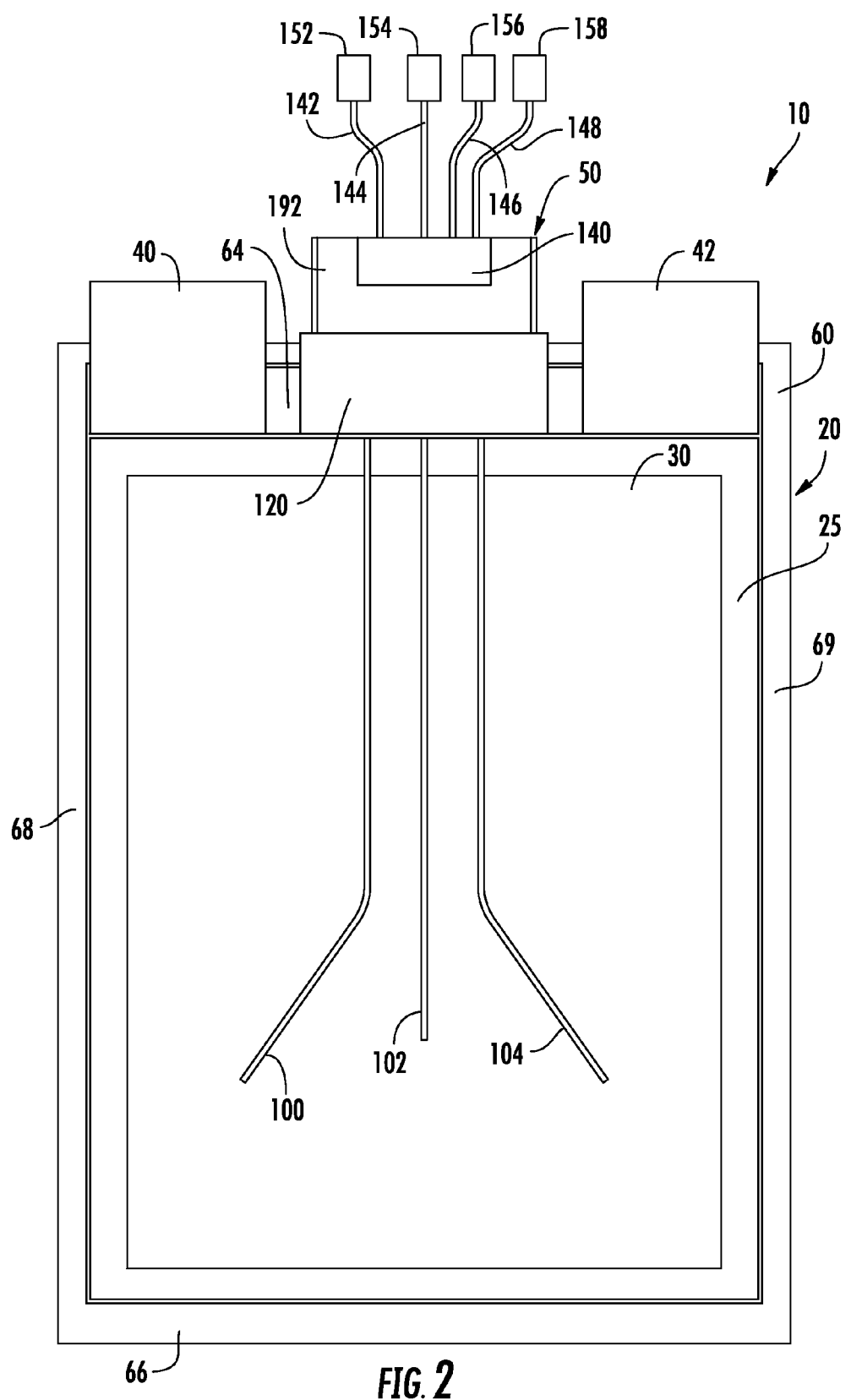
FIG. 2 is a schematic of a portion of a first side of the battery cell assembly of FIG. 1 including a battery cell and cables within an interior region of the battery cell assembly of FIG. 1.
Figure 3:
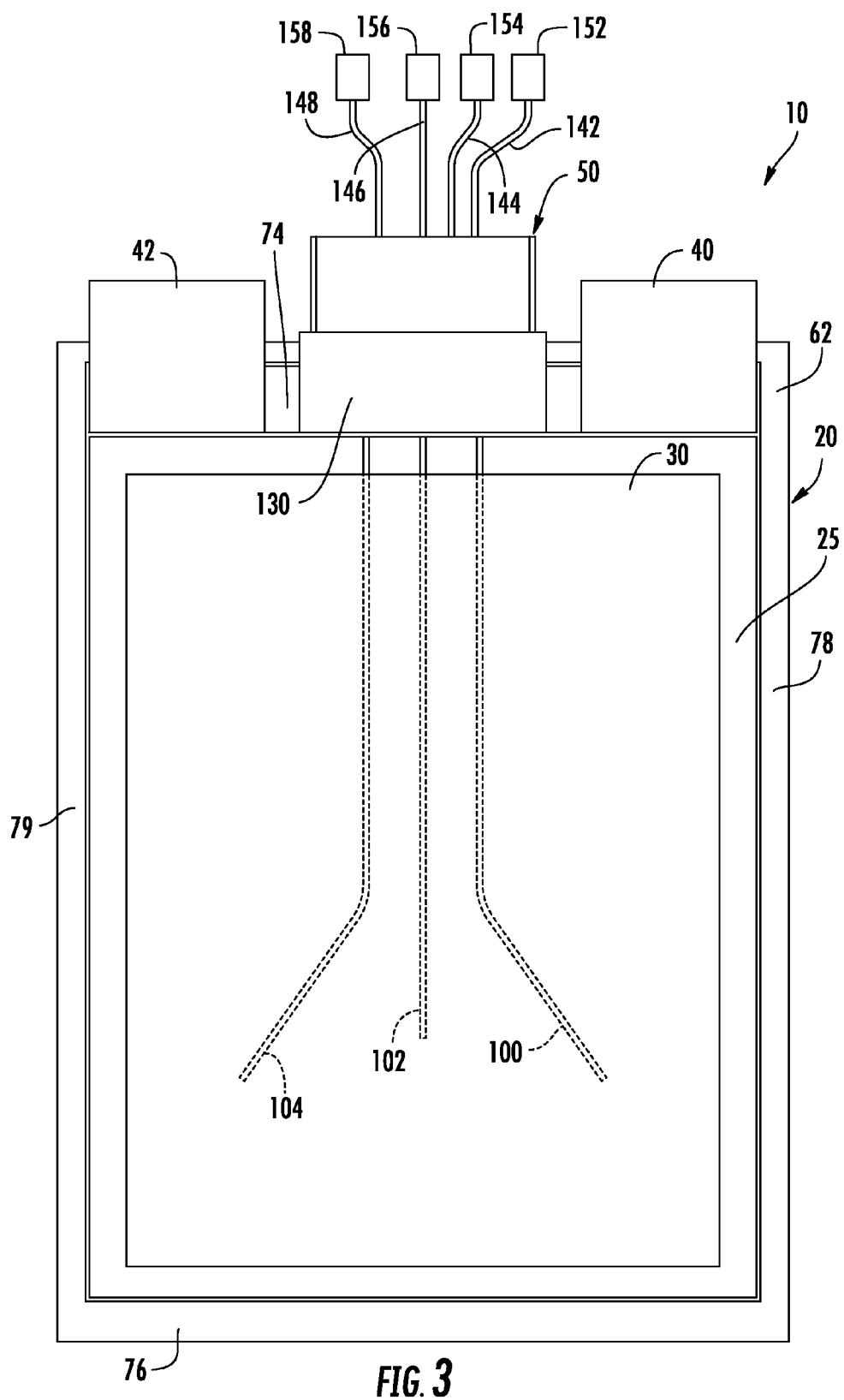
FIG. 3 is a schematic of a portion of a second side of the battery cell assembly of FIG. 1 including the battery cell and cables within the interior region of the battery cell assembly of FIG. 1.
Figure 4:
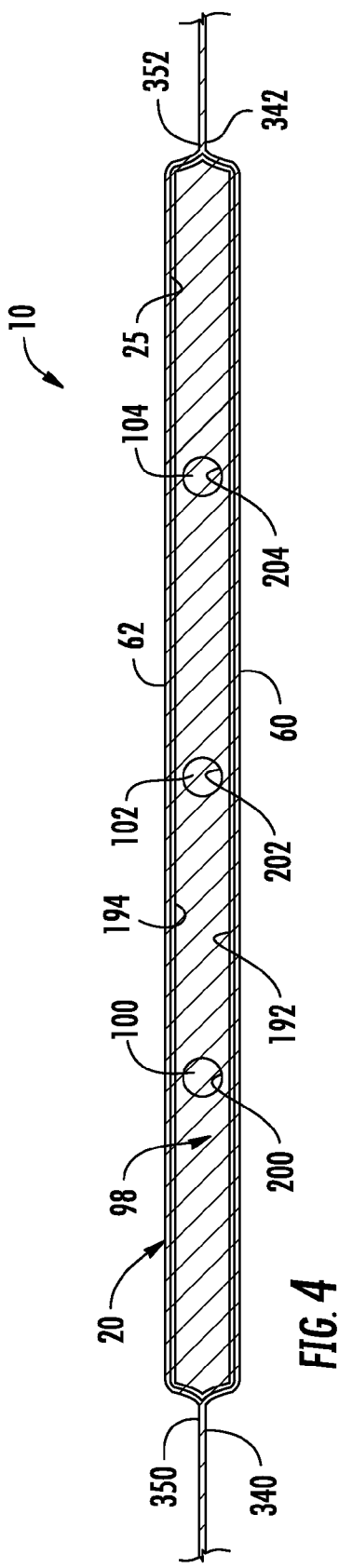
FIG. 4 is a cross-sectional view of a cable carrier assembly utilized in the battery cell assembly of FIG. 1.
Figure 5:
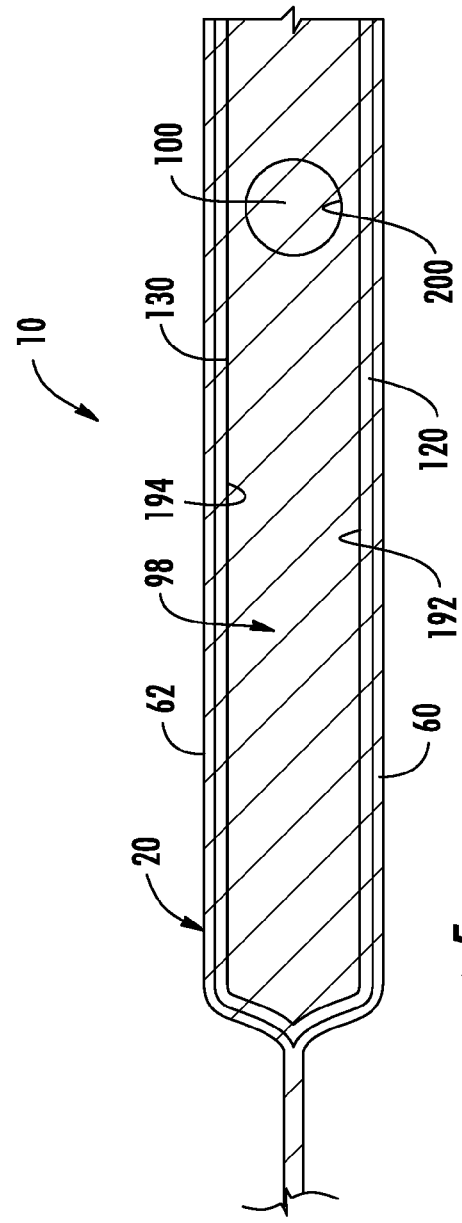
FIG. 5 is an enlarged view of a portion of the cable carrier assembly of FIG. 4.
Figure 6:
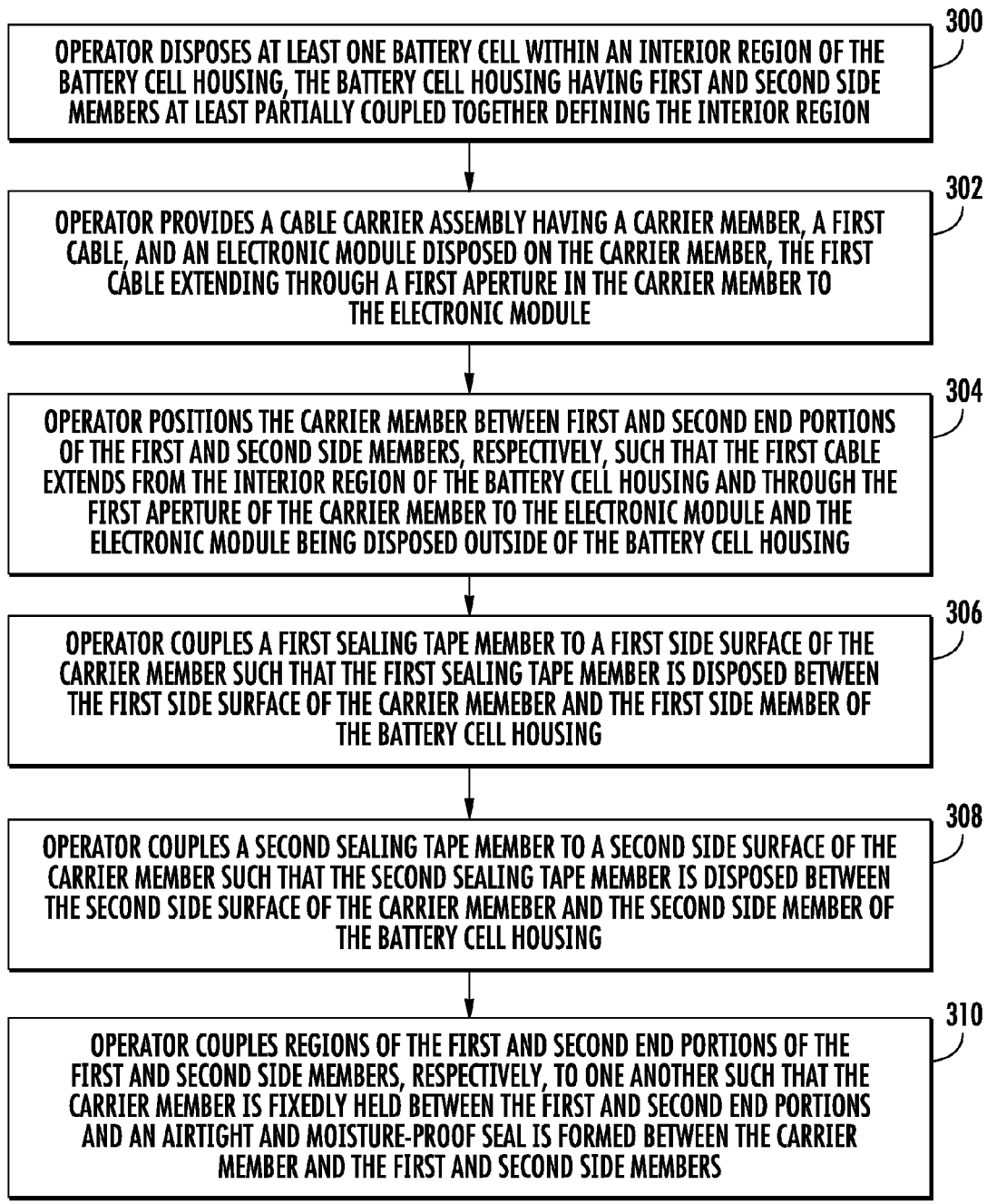
FIG. 6 is a flowchart of a method for manufacturing the battery cell assembly of FIG. 1 in accordance with another exemplary embodiment.

Referring to FIGS. 2, 3, and 4, the battery cell housing 20 includes a first side member 60 and a second side member 62 that are coupled together and define an interior region 25. In one exemplary embodiment, the first and second side members 60, 62 are each constructed of laminated plastic films. Also, in an exemplary embodiment, the first and second side members 60, 62 form a pouch-type battery cell housing.

Referring to FIG. 2, the first side member 60 is a rectangular-shaped sheet and includes end portions 64, 66 and edge portions 68, 69. The end portions 64, 66 are disposed at opposite ends of the first side member 60 and extend generally parallel to one another. The edge portions 68, 69 are disposed at opposite edges of the first side member 60 and extend generally parallel to one another and perpendicular to the end portions 64, 66.

Referring to FIG. 3, the second side member 62 is a rectangular-shaped sheet and includes end portions 74, 76 and edge portions 78, 79. The end portions 74, 76 are disposed at opposite ends of the second side member 62 and extend generally parallel to one another. The edge portions 78, 79 are disposed at opposite edges of the second side member 62 and extend generally parallel to one another and perpendicular to the end portions 74, 76.

Referring to FIGS. 2 and 3, the end portions 64, 66 of the first side member 60 are coupled to the end portions 74, 76, respectively, of the second side member 62. Also, the edge portions 68, 69 of the first side member 60 are coupled to the edge portions 78, 79, respectively, of the second side member 62.

The battery cell 30 is disposed within the interior region 25. The battery cell 30 comprises at least one active element that generates an operational voltage between the first and second electrical terminals 40, 42. In one exemplary embodiment, the battery cell 30 comprises a lithium-ion active element. Of course, in alternative embodiments, the battery cell assembly could utilize other types of active elements known to those skilled in the art.

Referring to FIGS. 2-5, the cable carrier assembly 50 is coupled to the battery cell housing 20 and is configured to route cables into the interior region 25 of the battery cell housing 20 for battery cell diagnostic purposes. The cable carrier assembly 50 includes a carrier member 98, one or more cables (in this exemplary embodiment, cables 100, 102, 104 are utilized), sealing tape members 120, 130, the electronic module 140, electrical cables 142, 144, 146, 148, and electrical contact members 152, 154, 156, 158.

The carrier member 98 is provided to fixedly hold and support the cables 100, 102, 104. In one exemplary embodiment, the carrier member 98 comprises a unitary rectangular-shaped sheet constructed of an electrically non-conductive material. For example, the carrier member 98 could be constructed of a plastic, a ceramic, or a fiberglass. Referring to FIG. 4, the carrier member 98 includes a first side surface 192 and a second side surface 194. Further, the carrier member 98 includes one or more apertures (in this exemplary embodiment apertures 200, 202, 204 are utilized) extending therethrough. The apertures 200, 202, 204 extend through the carrier member 98 from an end of the carrier member 98 communicating with the interior region 25 of the battery cell housing 20 to the electronic module 140 disposed on the first side surface 192 of the carrier member 98. The apertures 200, 202, 204 are sized and configured to receive the cables 100, 102, 104, respectively, therethrough. Further, the apertures 200, 202, 204 have a sealant disposed in the apertures 200, 202, 204 around the cables 100, 102, 104, respectively, such that airtight and moisture-proof seals are formed around the cables 100, 102, 104 in the apertures 200, 202, 204, respectively.

Referring to FIGS. 2 and 3, the carrier member 98 is disposed between end portions 64, 74 of the first and second side members 60, 62, respectively, and extends outwardly from the battery cell housing 20.

Referring to FIGS. 1, 2, 3, 4 and 5, the cables 100, 102, 104 are fixedly held by the carrier member 98. The cables 100, 102, 104 extend from the interior region 25 of the battery cell housing 20 and through the apertures 200, 202, 204, respectively, of the carrier member 98 to the electronic module 140 disposed on the first side surface 192 of the carrier member 98. In one exemplary embodiment, the cables 100, 102, 104 are disposed in the interior region 25 between the battery cell 30 and the first side member 60 of the battery cell housing 20. In an alternative embodiment, at least one of the cables 100, 102, 104 is disposed in the interior region 25 proximate to a peripheral edge of the battery cell 30. Further, in another alternative embodiment, at least one of the cables 100, 102, 104 is disposed in the interior region 25 within the battery cell 30. Also, in one exemplary embodiment, the cables 100, 102, 104 are optical fiber cables, and the electronic module 140 is a light transmitter/receiver module 140. In an alternative embodiment, the cables 100, 102, 104 could be electrically conductive cables each constructed of an electrically conductive material such as copper for example with an insulated sheath, or semi-conductive cables.

The electrical cables 142, 144, 146, 148 are electrically coupled to the electronic module 140, and are further electrically coupled to the electrical contact members 152, 154, 156, 158, respectively. The electronic module 140 can generate and send electrical signals through the electrical cables 142, 144, 146, 148 to the electrical contact members 152, 154, 156, 158, respectively, based on received signals (e.g., received light) from the cables 100, 102, 104.

The sealing tape members 120, 130 are coupled to first and second side surfaces 192, 194, respectively of the carrier member 98. The sealing tape members 120, 130 allow an airtight and moisture-proof seal to be formed between the carrier member 98 and the first and second side members 60, 62 of the battery cell housing 20 when the end portions 64, 74 are coupled together. At least a portion of the sealing tape member 120 is disposed between the first side surface 192 of the carrier member 98 and the first side member 60 of the battery cell housing 20. At least a portion of the sealing tape member 130 is disposed between the second side surface 194 of the carrier member 98 and the second side member 62 of the battery cell housing 20.

Referring to FIGS. 1-6, a flowchart of a method for manufacturing the battery cell assembly 10 in accordance with another exemplary embodiment will be described.

At step 300, an operator disposes at least one battery cell 30 within the interior region 25 of the battery cell housing 20. The battery cell housing 20 has first and second side members 60, 62 at least partially coupled together defining the interior region 25.

At step 302, the operator provides the cable carrier assembly 50 having the carrier member 98, the first cable 100, and the electronic module 140 disposed on the carrier member 98. The first cable 100 extends through the first aperture 200 in the carrier member 98 to the electronic module 140.

At step 304, the operator positions the carrier member 98 between first and second end portions 64, 74 of the first and second side members 60, 62, respectively, such that the first cable 100 extends from the interior region 25 of the battery cell housing 20 and through the first aperture 200 of the carrier member 98 to the electronic module 140 and the electronic module 140 is disposed outside of the battery cell housing 20.

At step 306, the operator couples the first sealing tape member 120 to a first side surface of the carrier member 98 such that the first sealing tape member 120 is disposed between the first side surface 192 of the carrier member 98 and the first side member 60 of the battery cell housing 20.

At step 308, the operator couples the second sealing tape member 130 to a second side surface of the carrier member 98 such that the second sealing tape member 130 is disposed between the second side surface 194 of the carrier member 98 and the second side member 62 of the battery cell housing 20.

Figure 7:
FIG. 7 is a block diagram of a coupling device utilized to couple together first and second side members of a battery cell housing of the battery cell assembly of FIG. 1.

At step 310, the operator couples regions of the first and second end portions 64, 74 of the first and second side members 60, 62, respectively, to one another utilizing a coupling device 370 (shown in FIG. 7) such that the carrier member 98 is fixedly held between the first and second end portions 64, 74 and an airtight and moisture-proof seal is formed between the carrier member 98 and the first and second side members 60, 62.

Figure 10:
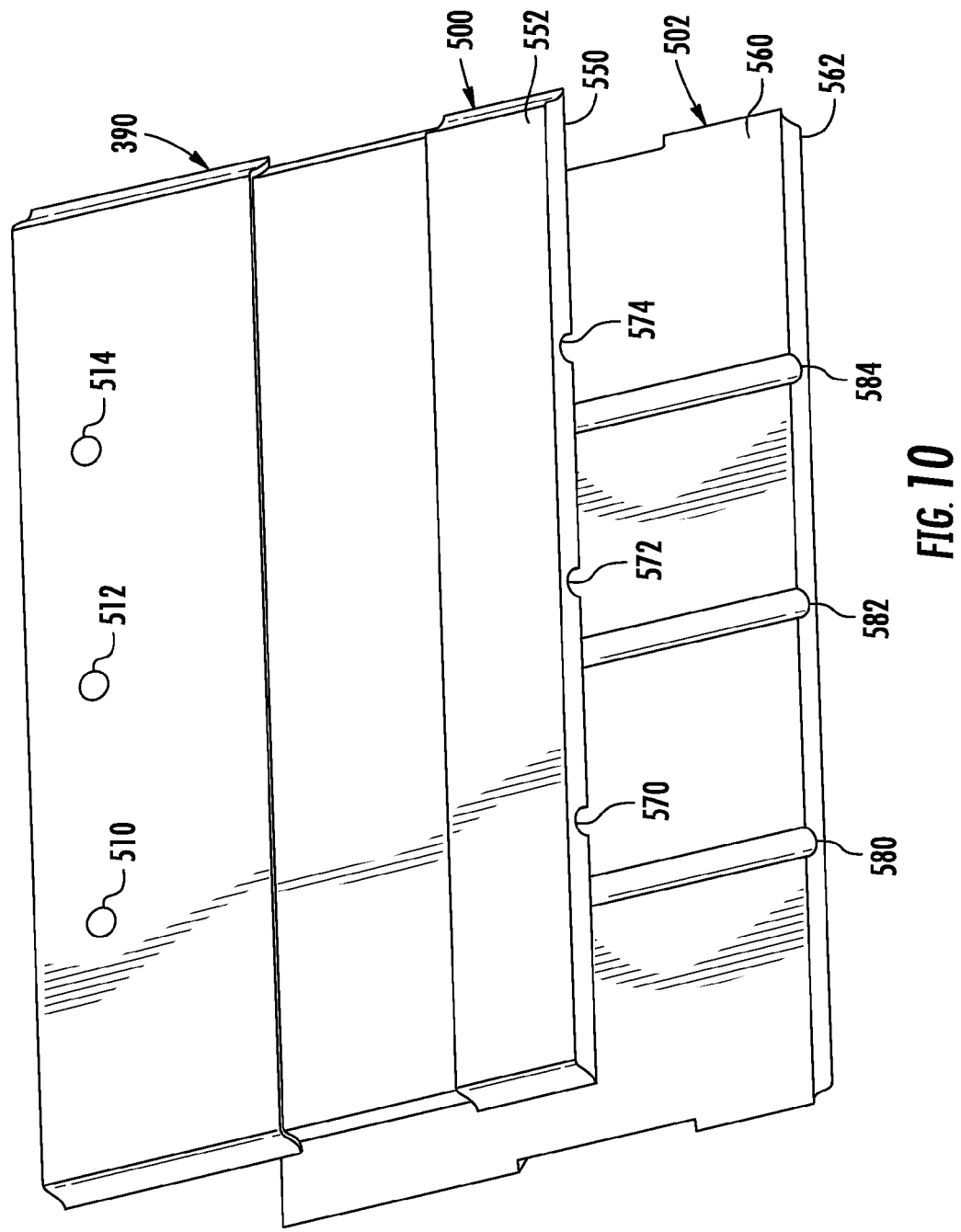
FIG. 10 is an exploded view of the cable carrier assembly of FIG. 8.
Figure 11:
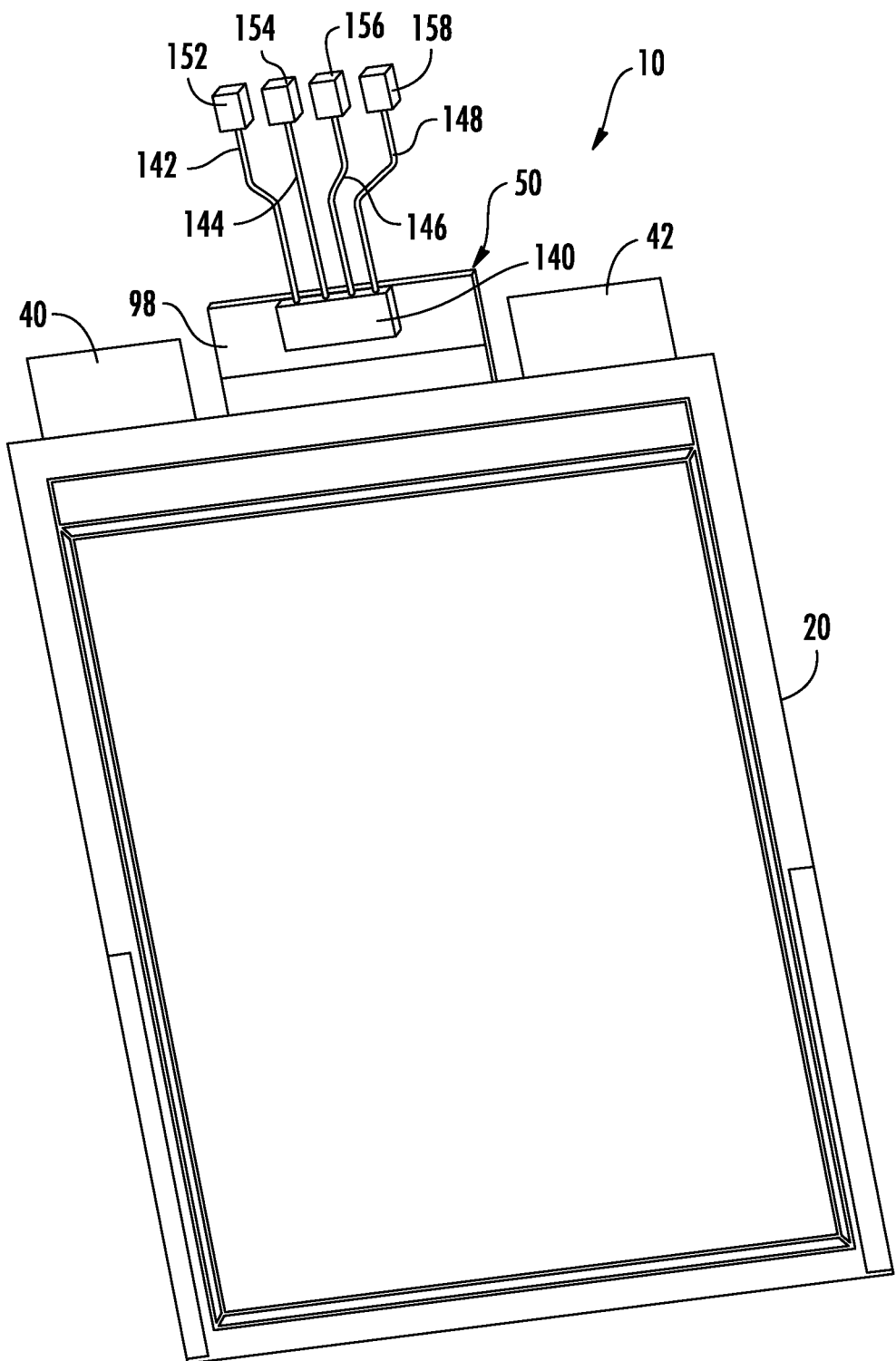
FIG. 11 is an isometric view of the battery cell assembly of FIG. 1 with the complete battery cell housing shown.

Referring to FIGS. 8-10, a cable carrier assembly 380 in accordance with another exemplary embodiment is illustrated. The cable carrier assembly 380 includes a carrier member 390, cables 400, 402, 404, sealing tape members 420, 430, and an electronic module (not shown) that is substantially similar to the electronic module 140. The cable carrier assembly 380 could be utilized in the battery cell assembly 10 instead of the cable carrier assembly 50. The primary difference between the cable carrier assembly 380 and the cable carrier assembly 50 is that the cable carrier assembly 380 utilizes the carrier member 390 comprising two sheet portions instead of a single unitary sheet.

The carrier member 390 is provided to fixedly hold and support the cables 400, 402, 404. In one exemplary embodiment, the carrier member 390 comprises a first sheet portion 500 and a second sheet portion 502 each constructed of an electrically non-conductive material. For example, the first sheet portion 500 and the second sheet portion 502 could be constructed of a plastic, a ceramic, or a fiberglass.

The first sheet portion 500 includes side surfaces 550 and 552 disposed apart from one another and substantially parallel to one another. The first sheet portion 500 further includes grooves 570, 572, 574 extending from the side surface 550 inwardly into the first sheet portion 500. An electronic module (not shown) is coupled to a portion of the side surface 552.

The second sheet portion 502 includes side surfaces 560 and 562 disposed apart from one another and substantially parallel to one another. The second sheet portion 502 further includes grooves 580, 582, 584 extending from the side surface 560 inwardly into the second sheet portion 502.

The side surface 550 of the first sheet portion 500 is disposed against the side surface 560 of the second sheet portion 502. The grooves 570, 580 are disposed proximate to one another to form a portion of the aperture 510. Further, the grooves 572, 582 are disposed proximate to one another to form a portion of the aperture 512. Also, the grooves 574, 584 are disposed proximate to one another to form a portion of the aperture 514. The apertures 510, 512, 514 are sized and configured to receive the cables 400, 402, 404, respectively, therethrough. Further, the apertures 510, 512, 514 are coated with a sealant such that the apertures 510, 512, 514 form airtight and moisture-proof seals around the cables 400, 402, 404, respectively. The carrier member 390 is disposed between end portions of first and second side members of a battery cell housing and extends outwardly from the battery cell housing.

The cables 400, 402, 404 are fixedly held by the carrier member 390. The cables 400, 402, 404 extend from an interior region of a battery cell housing and through the apertures 510, 512, 514, respectively, of the carrier member 390 to a region outside of the battery cell housing. In one exemplary embodiment, the cables 400, 402, 404 are optical fiber cables. In an alternative embodiment, the cables 400, 402, 404 could be electrically conductive cables each constructed of an electrically conductive material such as copper for example with an insulated sheath, or semi-conductive cables.

The battery cell assembly 10 and the method for manufacturing the battery cell assembly 10 provide a substantial advantage over other battery cell assemblies and methods. In particular, the battery cell assembly 10 and the method provide a technical effect of utilizing a cable carrier assembly coupled to a battery cell housing that protects and supports cables that extend from the assembly to an interior region of the battery cell housing and form an airtight and moisture-proof seal with the battery cell housing. In particular, the cable carrier assembly protects the cables from being crushed or melted when side members of the battery cell housing are coupled together.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery cell assembly, comprising:
a battery cell housing having first and second side members coupled together defining an interior region;
at least one battery cell disposed within the interior region of the battery cell housing;
first and second electrical terminals operably coupled to the at least one battery cell and extending outwardly from the battery cell housing;
a cable carrier assembly coupled to the battery cell housing, the cable carrier assembly comprising:
a carrier member having a first aperture extending therethrough; the carrier member being disposed between first and second end portions of the first and second side members, respectively, and extending outwardly from the battery cell housing;
a first optical fiber cable fixedly held by the carrier member, the first optical fiber cable extending from the interior region of the battery cell housing and through the first aperture of the carrier member to a light transmitter/receiver module;
first and second sealing tape members coupled to first and second side surfaces of the carrier member, at least a portion of the first sealing tape member disposed between the first side surface of the carrier member and the first side member of the battery cell housing, at least a portion of the second sealing tape member disposed between the second side surface of the carrier member and the second side member of the battery cell housing; and
the light transmitter/receiver module being disposed on the carrier member outside of the battery cell housing and being electrically coupled to an electrical contact member, the light transmitter/receiver module being operably coupled to the first optical fiber cable.

2. The battery cell assembly of claim 1, wherein the carrier member is a single unitary sheet having the first aperture extending therethrough.

3. The battery cell assembly of claim 2, wherein the carrier member is substantially rectangular-shaped.

4. The battery cell assembly of claim 1, wherein the carrier member comprises first and second sheet portions, the first and second sheet portions having first and second side surfaces, respectively, that are disposed adjacent to one another, the first aperture extending through portions of the first and second side surfaces.

5. The battery cell assembly of claim 1, wherein an airtight and moisture-proof seal is formed between the carrier member and the first and second side members.

6. The battery cell assembly of claim 1, wherein the cable carrier assembly is disposed between the first and second electrical terminals.

7. The battery cell assembly of claim 1, wherein the carrier member is constructed of at least one of a high temperature plastic, a ceramic, and a fiberglass.

8. The battery cell assembly of claim 1, wherein the carrier member is constructed of an electrically non-conductive material.

9. The battery cell assembly of claim 1, wherein the light transmitter/receiver module is adapted to send an electrical signal through an electrical cable to an electrical contact member based on received light from the first optical fiber cable.

\* \* \* \* \*